United States Patent
Burch et al.

(10) Patent No.: US 9,942,751 B2
(45) Date of Patent: Apr. 10, 2018

(54) AUDIO PROXIMITY-BASED MOBILE DEVICE DATA SHARING

(71) Applicant: NetIQ Corporation, Provo, UT (US)

(72) Inventors: Lloyd Leon Burch, Payson, UT (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 735 days.

(21) Appl. No.: 14/167,862

(22) Filed: Jan. 29, 2014

(65) Prior Publication Data

US 2015/0215775 A1 Jul. 30, 2015

(51) Int. Cl.
*H04L 29/06* (2006.01)
*H04W 12/04* (2009.01)
*H04W 12/08* (2009.01)
*H04W 84/12* (2009.01)

(52) U.S. Cl.
CPC ......... *H04W 12/04* (2013.01); *H04L 63/0823* (2013.01); *H04L 63/18* (2013.01); *H04W 12/08* (2013.01); *H04W 84/12* (2013.01)

(58) Field of Classification Search
CPC ..... H04W 12/04; H04W 84/12; H04W 12/08; H04L 63/18; H04L 63/0823
USPC ........................................................ 713/150
See application file for complete search history.

(56) References Cited

U.S. PATENT DOCUMENTS

| 8,165,525 | B2 | 4/2012 | Eisenbach | |
|---|---|---|---|---|
| 2009/0298426 | A1* | 12/2009 | Helvick | G06Q 10/02 455/41.1 |
| 2010/0262828 | A1* | 10/2010 | Brown | H04L 9/0844 713/171 |
| 2012/0045002 | A1* | 2/2012 | Zivkovic | G06F 21/335 375/259 |
| 2012/0128154 | A1* | 5/2012 | Ran | H04K 1/00 380/255 |
| 2012/0149304 | A1 | 6/2012 | Baliga | |
| 2013/0029597 | A1 | 1/2013 | Liu et al. | |
| 2013/0166555 | A1 | 6/2013 | Pfaff | |
| 2013/0344852 | A1 | 12/2013 | Kolodziej | |
| 2014/0028818 | A1* | 1/2014 | Brockway, III | H04N 5/23206 348/61 |
| 2014/0256260 | A1* | 9/2014 | Ueda | H04W 76/023 455/41.2 |

* cited by examiner

*Primary Examiner* — John B King
(74) *Attorney, Agent, or Firm* — Schwegman Lundberg & Woessner, P.A.

(57) ABSTRACT

At least two mobile devices introduce one another and select data for transfer to and receipt by at least one receiving mobile device using audio communications. Each of the devices uses its speaker(s) and its microphone to introduce and select the data. Once secure audio communications are confirmed between the devices, the selected data is acquired by the at least one receiving mobile device using audio communications or a different out-of-band communication wired or wireless network.

17 Claims, 5 Drawing Sheets

AUDIO PROXIMITY-BASED MOBILE DEVICE DATA SHARING

BACKGROUND

Mobile devices (phones, tablets, laptops, etc.) are owned and used by most people today. This means that the knowledge level of those using the devices is no longer just reserved for a "high-tech" (tech-savvy) group of individuals. Because of this, mobile solutions have to be simple to use. One of the many tasks, which are done using a mobile phone (type of mobile device), is to exchange data with other phones in close proximity. The industry already has many ways to do this, but each has limitations. Some are limited to phone type; others are limited by the Operation System (OS), while still others only work with a single vendor. Furthermore, some require the devices to touch one another and have the hardware in the phones to sense the other phone from the touching, such as Near-Field Communication (NFC) enabled devices.

Also, mobile device to mobile device transfers very seldom require any kind of real security. The industry has some security mechanisms in place for mobile device to Point-Of-Sale (POS) terminal devices, but for the most part has ignored security related to mobile device to mobile device data transfers.

Thus, the existing mobile device to mobile device data transfers are often not interoperable across disparate: mobile devices, mobile device types, hardware platforms, OS's, and application vendors. Moreover, existing mobile device to mobile device data transfers often lack any real security mechanisms making such transfers vulnerable to malicious eavesdroppers.

SUMMARY

Various embodiments of the invention provide techniques for audio proximity-based mobile device data sharing. In an embodiment, a method for audio proximity-based mobile device data sharing is presented.

Specifically, an audio message is communicated over a speaker interfaced to a mobile device. A second audio message is received in response to the audio message through a microphone interfaced to the mobile device. The second audio message received from a speaker interfaced to a second mobile device. Finally, facilitation of delivery of data associated with the mobile device is made to the second mobile device.

DETAILED DESCRIPTION

Figure 1A:
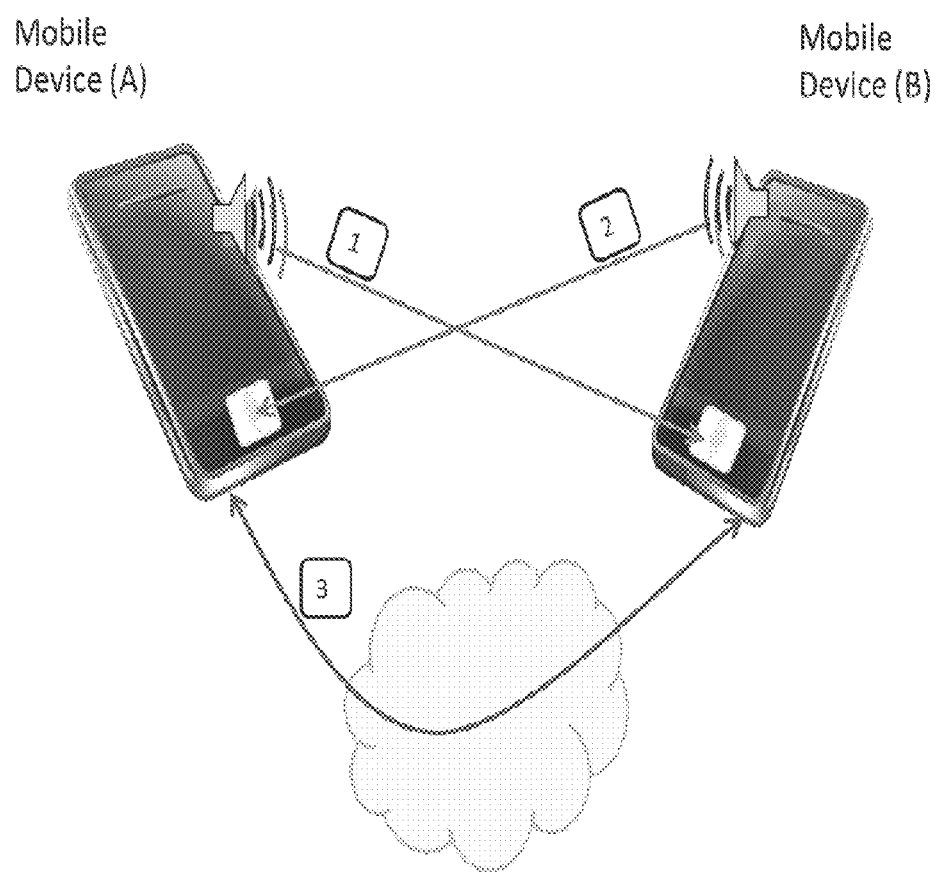
FIGS. 1A-1B are flow diagrams depicting architectures and processing for audio proximity-based mobile device data sharing, according to an example embodiment presented herein.

A "resource" includes a user, service, system, device, directory, data store, groups of users, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

A "document" refers to any data file. So, a document can be text, audio, video, graphics, images, or combinations of these things.

Various embodiments of this invention can be implemented in existing network architectures.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1B and 2-4.

Figure 1B:
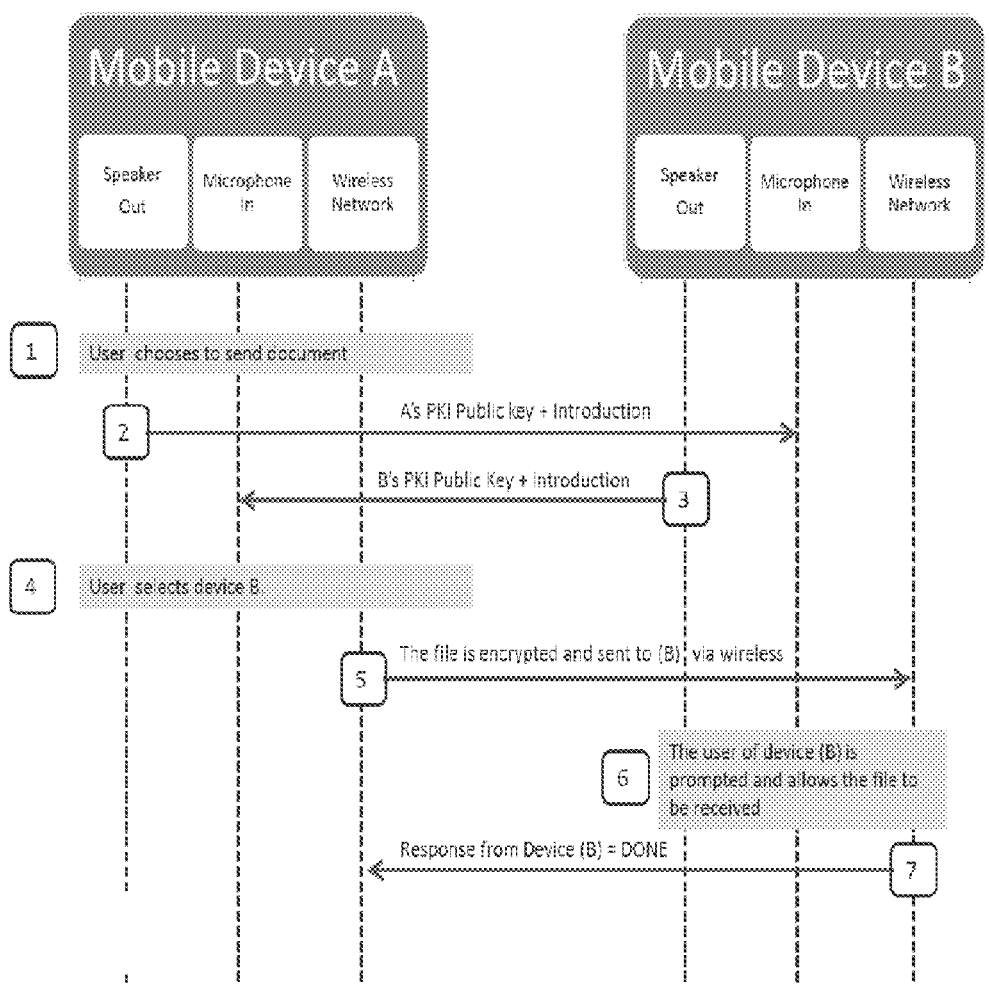

FIGS. 1A-1B are flow diagrams depicting architectures and processing for audio proximity-based mobile device data sharing, according to an example embodiment presented herein. The FIG. 1A depicts an example architecture for performing a secure proximity-based audio connection between two mobile devices with a subsequent data transfer that occurs out-of-band (and in-band in some cases) from established secure audio communications.

The architecture of the FIG. 1A is shown for purposes of illustration of particular embodiments of the invention; it is noted that other embodiments of the invention (FIGS. 2-4) need not be limited to these architectures FIGS. 1A-1B, as other hardware and software architectures can be used as well.

The FIG. 1A depicts an architecture for audio proximity-based mobile device data sharing. The architecture includes two mobile devices (depicted as smart phones or phones in the FIG. 1A but could be any two mobile devices selected from laptops, phones, tablets, wearable processing devices (GOOGLE GLASS®, smart watch, etc.), and the like). In an embodiment, the two mobile devices are different types of devices, devices with different hardware capabilities, devices with different OS's, and/or devices with different software capabilities. In fact, all that is needed is that each mobile device have a speaker (or capable of interfacing to a speaker in proximity to that mobile device, such as through a Bluetooth connection) and that each device have a microphone (or capable of interfacing to a microphone in proximity to that mobile device, such as through a Bluetooth connection).

At 1, connection data is modulated and output from a speaker of device A to the input microphone of device B. This implies that devices A and B are within a close enough proximity to one another such that the connection data is of a sufficient volume when outputted through the speaker of device A that it can be detected and captured by the microphone of device B. The exact proximity is therefore limited by the sensitivity of B's microphone and the output threshold volume of A's speaker.

At 2, data is modulated and output from device B's speaker to device A's microphone.

At 3 (and in this embodiment of the invention), a wireless network is used by both devices A and B to send data between devices A and B. In some embodiments, the network can be wired, an Intranet, the Internet, and/or Peer-to-Peer (P2P).

It is noted that the connection data that is transferred as audio data initially from device A can be from a user of device A electing to send a document (data sent at 3) to device B or can be from a user that is requesting a document (data sent at 3) from device B. So, the connection data is initially a request to establish a secure connection between devices A and B via audio transmitted (via a speaker) and received (via a microphone) data. The connection data can include a variety of details, some of which are described in greater detail with respect to the discussion of the FIG. 1B.

The FIG. 1B provides an example illustration of the interactions between devices A and B of the FIG. 1A. The example illustration is provided within the context of two users who each have a mobile device. In the example, the user of device A is sending a document (residing, for the example, on device A) to the user of device B. It is noted that the two devices A and B can be of different types, hardware, and/or software configurations (capabilities). Each device (A and B) have access to its own speaker and microphone.

Reference is now made to the FIG. 1B and its depicted processing scenario for the above-discussed example embodiment.

At 1, the user of device A selects the output icon while viewing a document (such as a PDF document) on an iPhone®. The user selects a File option at the top of the viewing application. This brings up a selection for the user to print, save, email, or send the document to another user.

In an embodiment, the Application Programming Interface (API) of the application providing the view of the PDF is modified to provide an option for the user of device A to send the document to someone in proximity (within a geographical closeness) to device A. So, features of the embodiment can be integrated as enhancements to existing APIs of existing mobile device viewers or editors. In an embodiment, the viewer application on the phone (for the present example) is a customized application to display a variety of document types and provide the "send to someone in proximity to me" feature.

The user selects a "send to someone in proximity to me" option from the viewer, at 1.

At 2, a customized application (mobile app) on device A begins sending a modulated audio signal out of the speaker of device A as audio data (or audio message). The audio message includes device A's public key and an introduction packet directed to device B. In an embodiment, the introduction packet includes a description of device A, a name for the user or owner of device A, an identifier for the document selected by the user of device A that is to be sent to device B, and, perhaps other information, such as data relevant to setting up and using a Transmission Control Protocol (TCP) using Internet Protocol (IP) (TCP/IP).

At 3, another instance of the mobile application processing on device B receives the connection data from 2 by detecting the connection data being received on B's microphone as an audio message. The audio message is demodulated and inspected by B's mobile application. If after evaluation policy conditions, device B determines that receiving the document from device A is permissible; then the B's mobile app begins sending out its own modulated audio signal (B's audio message). In an embodiment, B's audio message includes B's public key and B's introduction packet and, perhaps in some cases, a secret that is encrypted with device A's public key (sent by A's mobile app as A's audio message at 2).

At 4, the user of device A sees, via A's mobile app, a list of all devices that have or are sending response audio messages (note that connections can occur via A's audio message to multiple devices in proximity to device A and not just device B as used in the present example). Again, at 4, A's mobile app detects B's audio message via A's microphone and demodulates B's audio message to present in an interface of A's mobile app the list, which in the present example includes device B and some (or all) of B's audio message demodulated. The user of device A selects device B from the list. Information included in B's demodulated audio message includes B's introduction packet, which describes device B and/or the document that the user of device B is requesting or is permitting to be transferred to device B from device A.

At 5, A's mobile app uses the information included in B's introduction packet to build an out-of-band, and perhaps, P2P connection to device B using a wireless network (out-of-band because the document transfer occurs using a different network from the audio network initially used by devices A and B to establish a connection). A's mobile app then encrypts the document with B's secret (sent at 3 by B's mobile app in B's modulated audio message).

At 6, an interface of B's mobile app prompts the user of device B to give permission to receive the encrypted document over the wireless connection from device A. This can occur by A's mobile app requesting the wireless connection over the wireless network at 5, which B's mobile app detects. Assuming the user of device B authorizes the connection to receive the file, over the wireless connection request from A's mobile app, A's mobile app sends the encrypted document using any IP.

At 7, and once the entire encrypted document is received at device B, B's mobile app sends a file/document download complete message back to A's mobile app (again over the wireless connection).

It is to be noted that the processing depicted at 4-7 can be repeated if more than one device, besides device B, is in proximity to device A and is designated (via A's mobile app) to receive the document. In this manner, the selected document for transfer can be sent to a group of devices in proximity to device A based on those devices being within audio range of device A.

It should also be noted that for added security measure, B's public key can be used to validate B's introduction packet by having B's mobile app sign B's introduction packet with B's private key.

In some embodiments, a policy condition can be dynamically evaluated by the instances of mobile apps processing on their mobile devices to restrict which devices that can be part of the document being shared. Policy conditions can also define that the Public Key Infrastructure (PKI) keys are acquired from a digital certificate, which is associated with a specific root or parent. Such a situation would allow a company policy that just allows employees or partners of the company to share the document using this technology.

Also, the processing flows show device B talking directly to device A. This is but one scenario as a server or other devices could act as middleware (an intermediary) to complete the wireless connection for document transfer. Such an intermediary can also validate the identity of the devices involved in the document transfer; and the intermediary may also permit access through firewalls or providing routing features for the wireless document transfer.

In some cases, the document transfer network can be wired or wired for just one of the devices.

Still further, the document transfer network can be the audio network used to initially establish communications of the devices in proximity to one another (this may occur when the document being transferred is small in size (based on some policy condition defining a threshold for the size of the document to be sent using audio communications). (Note that this embodiment would be an in-band document transfer.)

The document transfer network may also not require a connection at all between the devices, in some embodiments. For example, device A may upload the document being sent to a website or web location using its available network (cellular or WiFi), then device B after receiving an audio message from device A that the document is available (and perhaps the website for retrieval), device B uses its own available network (which may be different from device A) to connect (and perhaps authenticate) to the website and download the document. In fact, the document, in some embodiments, may initially reside on the website and not on device A and the audio communications are used to authenticate and communicate how device B is to acquire the document from that website. In this latter case, the document can essentially be simultaneously obtained by multiple receiving devices using their own networks from the website (assuming each of these devices is in audio proximity to device A).

In still other cases, the document transfer network is a Bluetooth, Bluetooth Low Energy (BLE), or Radio Frequency (RF) connection between the devices.

As has been demonstrated and is further discussed below, the embodiments herein permit multiple mobile devices to introduce one another, perform some security checking, and facilitate document sharing via audio communications utilizing the mobile devices' speakers and microphones. This provides a security mechanism to ensure that the aforementioned document sharing occurs with documents that are within audio proximity to one another.

These embodiments presented with the FIGS. 1A-1B and other embodiments of the invention are now discussed with reference to the FIGS. 2-4.

Figure 2:
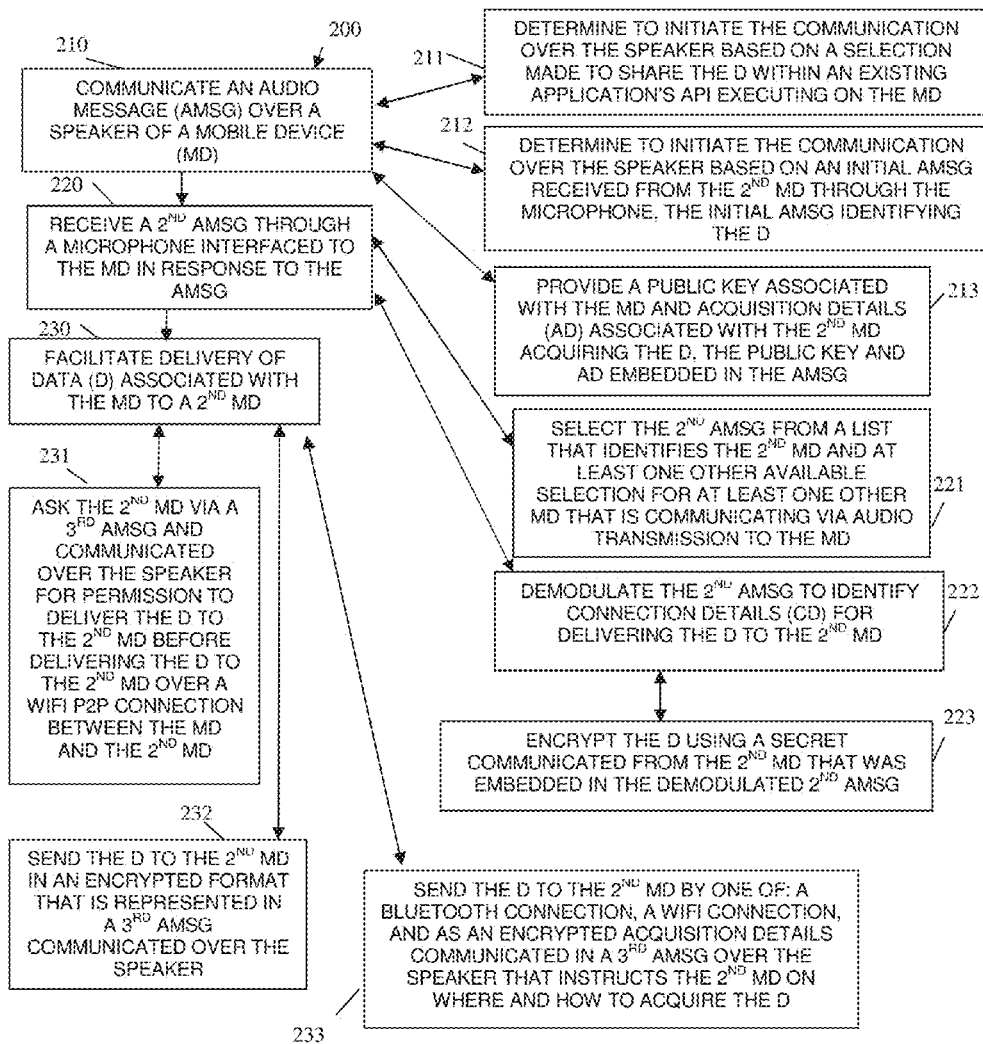
FIG. 2 is a diagram of a method for audio proximity-based mobile device data sharing, according to an example embodiment.

FIG. 2 is a diagram of a method 200 for audio proximity-based mobile device data sharing, according to an example embodiment. The method 200 is implemented as one or more software modules (herein after referred to as "audio sharing service"). The audio sharing service includes executable instructions that are implemented, programmed, and resides within memory and/or a non-transitory machine-readable storage media; the executable instructions execute on one or more processors of a device and have access to one or more network connections associated with one or more networks. The networks may be wired, wireless, or a combination of wired and wireless.

In an embodiment, the audio sharing service processes on the mobile device A of the FIGS. 1A-1B as A's mobile app.

According to an embodiment, the device that executes the audio sharing service is one of: a smart phone, a tablet, a laptop, and a wearable processing device.

The processing of the audio sharing service reflects a mobile device that is sharing a document with one or more other mobile devices that are in proximity to the mobile device having the audio sharing service. The FIG. 3 discusses the processing associated with a mobile device that receives a shared document from the audio sharing service. It is to be noted that both the sharing features (FIG. 2) and consuming features (FIG. 3) can be configured within a single mobile application (mobile app) that uses different modes of operations to perform sharing and consuming. This single mobile app can reside as different processing instances on each mobile device involved in audio proximity-based data sharing. In this manner, the audio sharing service can be viewed as a sharing mode of operation for the mobile apps discussed above with respect to the FIGS. 1A-1B (specifically A's mobile app, since A was presented as the sharing device in the example illustrations of the FIGS. 1A-1B).

At 210, the audio sharing service communicates a message that is modulated as an audio message over a speaker interfaced to the mobile device that executes the audio sharing service. In an embodiment, the audio message is of a frequency that is not detectible by a human ear but is detectable my a microphone of a second mobile device. The frequency and volume of the audio message delivered over the speaker is configurable.

According to an embodiment, at 211, the audio sharing service determines to initiate the communication over the speaker based on a selection made to share data (document as described above) within an existing application's Application Programming Interface (API) executing on the mobile device. So, an enhancement is made to an existing document viewer or editor to provide a feature for selecting to send a document to another device using the audio proximity mechanisms described herein. This situation was also described above with reference to the FIGS. 1A-1B.

In an embodiment, at 212, the audio sharing service determines to initiate the communication over the speaker based on an initial audio message received from the second mobile device through a microphone interfaced to the mobile device. That is, the audio sharing service monitors the microphone of the mobile device to detect and receive the initial audio message, which is then demodulated and decrypted (if necessary and perhaps only portions of the demodulated initial audio message require decryption). The initial audio message identifies that data that the second mobile device is requesting.

In another case, at 213, the audio sharing service provides a public key associated with the mobile device (and/or the audio sharing service) and acquisition details associated with the second device for acquiring the data. The public key and the acquisition details embedded in a modulated version of the audio message. This situation was also discussed above with reference to the FIGS. 1A-1B.

At 220, the audio sharing service receives a second audio message in response to the communicated audio message. The second audio message received from a speaker interfaced to the second mobile device and detected on a microphone interfaced to the mobile device (which is monitored by the audio sharing service).

According to an embodiment, at 221, the audio sharing service selects the second audio message from a list provided in an interface associated with the audio sharing service on the mobile device to a user. The user makes a selection that identifies the second mobile device via the interface and the audio sharing service acquires this selection. The list also includes at least one other available selection that the user could select via the interface. The at least one other available selection associated with at least one other mobile device that is communicating via audio transmissions to the mobile device.

In an embodiment, at 222, the audio sharing service demodulates the second audio message (received in modulated audio format) to identify connection details for delivering the data to the second mobile device. This was discussed above with reference to the FIGS. 1A-1B.

In an embodiment of 222 and at 223, the audio sharing service encrypts the data using a secret communicated from the second mobile device that was embedded in the demodulated second audio message (discussed above with reference to the FIGS. 1A-1B.

At 230, the audio sharing service facilitates delivery of data associated with the mobile device to the second mobile device. This can be achieved in a variety of manners.

According to an embodiment, at 231, the audio sharing service asking (requesting) the second mobile device, via a third audio message communicated over the speaker, for permission to deliver the data to the second mobile device before delivering the data to the second mobile device over a WiFi P2P connection between the mobile device and the second mobile device.

In an embodiment, at 232, the audio sharing service sends the data to the second mobile device in an encrypted format that is represented in a third audio message and communicated over the speaker of the mobile device.

In still another situation, at 233, the audio sharing service sends the data to the second mobile device by one of: a Bluetooth connection, a WiFi connection, and as encrypted acquisition details communicated in a third audio message over the speaker of the mobile device that instructs the second mobile device on where and how to acquire the data. This last option may be useful when the data being requested by the second device resides remote from the mobile device or is uploaded from the mobile device to a website for the second mobile device to independent acquire.

Figure 3:
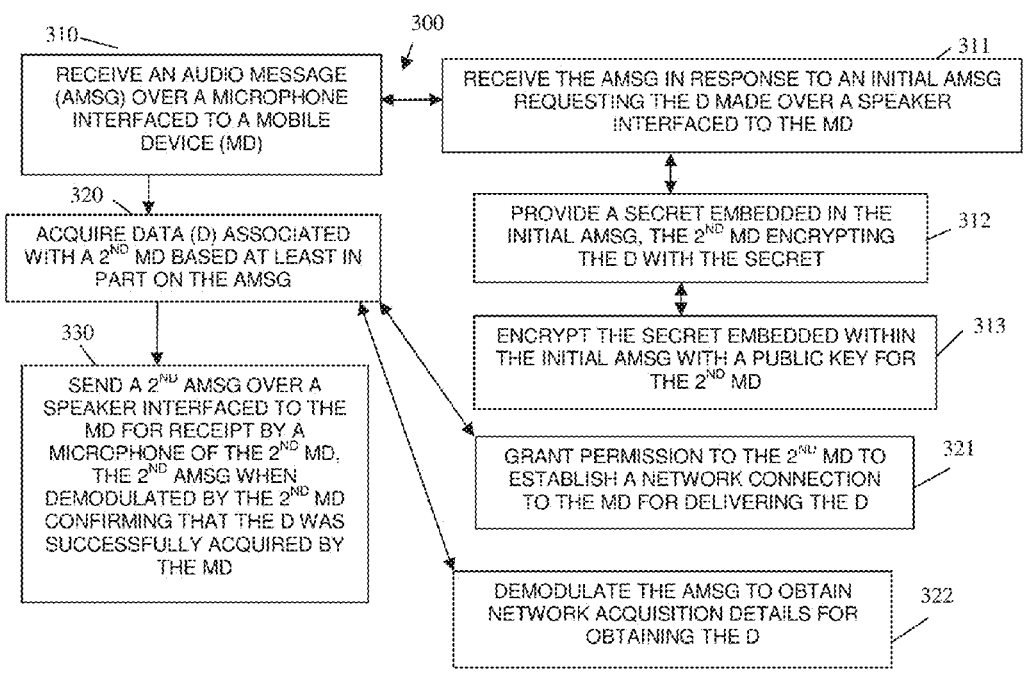
FIG. 3 is a diagram of another method for audio proximity-based mobile device data sharing, according to an example embodiment.

FIG. 3 is a diagram of another method for audio proximity-based mobile device data sharing, according to an example embodiment. The method 300 is implemented as one or more software module(s) (herein after referred to as "audio consuming service"). The one or more software module are represented as executable instructions that are implemented, programmed, and resides within memory and/or a non-transitory machine-readable storage medium; the executable instructions execute on one or more processors of a device and have access to one or more network connections associated with one or more networks. The networks may be wired, wireless, or a combination of wired and wireless.

In an embodiment, the audio consuming service processes on the mobile device B of the FIG. 1B as B's mobile app.

According to an embodiment, the device that executes the audio consuming service is one of: a smart phone, a tablet, a laptop, and a wearable processing device.

The processing of the audio consuming service is described from the perspective of a mobile device that is consuming a shared document communicated from a sharing mobile device that is in audio proximity to the mobile device having the audio consuming service. Again, it is noted that both the audio consuming service and the audio sharing service of the FIG. 2 can be a single mobile app residing on each mobile device (as different processing instances), such that the audio consuming service represents a consuming mode of operation for that single mobile app.

At 310, the audio consuming service receives an audio message in modulated audio format over a microphone interfaced to the mobile device.

According to an embodiment, at 311, the audio consuming service receives the audio message in response to an initial audio message that identifies a request for the data and the initial audio message made in modulated audio format over a speaker interfaced to the mobile device.

In an embodiment of 311 and at 312, the audio consuming service provides a secret embedded in the initial audio message. The second mobile device encrypts the data with the secret.

In an embodiment of 312 and at 313, the audio consuming service encrypts the secret embedded in the modules initial audio message with a public key for the second mobile device.

At 320, the audio consuming service acquires the data associated with the second mobile device at least in part based on the audio message (for example using a secret, public key, location for acquiring the data, network connection to use for the data to be pushed to of pulled from the mobile device, and the like—some of which or all of which may be included in the audio message).

According to an embodiment, at 321, the audio consuming service grants permission to the second mobile device to establish a network connection to the mobile device for delivering the data (via a push from the second mobile device to the mobile device or via a pull from the second mobile device made by the mobile device during the network connection).

In an embodiment, at 322, the audio consuming service demodulates the audio message to obtain network acquisition details for obtaining the data (for example, a website where the data can be acquired).

According to an embodiment, at 330, the audio consuming service sends a second audio message over a speaker interfaced to the mobile device for receipt by a microphone of the second mobile device. The second audio message when demodulated by the second mobile device confirming that the data was successfully acquired by the mobile device.

Figure 4:
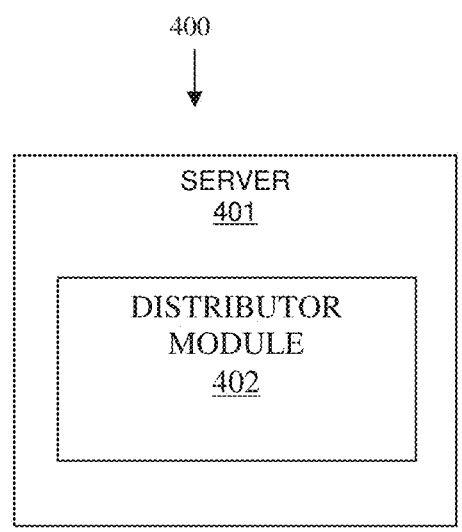
FIG. 4 is a diagram of an audio proximity-based mobile device data sharing system, according to an embodiment.

FIG. 4 is a diagram of an audio proximity-based mobile device data sharing system 400, according to an embodiment. Various components of the audio proximity-based mobile device data sharing system 400 are software module (s) represented as executable instructions, which are programmed and/or reside within memory and/or non-transitory computer-readable storage media for execution by one or more devices. The components and the devices have access to one or more network connections over one or more networks, which are wired, wireless, or a combination of wired and wireless.

According to an embodiment, the audio proximity-based mobile device data sharing system 400 implements, in whole or in part and inter alia, various features of the FIGS. 1A-1B and 2-3.

The audio proximity-based mobile device data sharing system 400 includes a server 401 and a distributor module 402.

The server 401 includes one or more processors, memory, and non-volatile storage.

The server 401 includes a distributor module 402. The distributor module 402 is implemented as one or more software modules having executable instructions that execute on the one or more processors of the server 401. In an embodiment, the distributor module 402 when executed distributes and initially configures the mobile apps depicted in the FIGS. 1A-1E and 2-3 (A's mobile app, B's mobile app, audio sharing service, and audio consuming service) to mobile devices that share data based on audio proximity to one another. The audio proximity-based mobile device data sharing system 400 distributes a single configured instance of a mobile app to each mobile device involved in audio proximity-based data sharing. Each instance capable of using a first mode of operation to share data with other devices in audio proximity and each instance capable of using a second mode of operation to consume data being shared from a device in audio proximity.

The distributor module 402 is adapted to configure an audio data sharing mobile application (mobile app) for delivery to a mobile device. The audio data sharing mobile application when initiated on the mobile device facilitates secure data sharing between the mobile device and other mobile devices that are in audio proximity to the mobile device using a speaker and a microphone interfaced to the mobile device. The details of the audio communication and data sharing were provided above with reference to the FIGS. 1A-1B and 2-3. Each of the other mobile devices has an executing instance of the audio data sharing mobile application.

According to an embodiment, the distributor module 402 is further adapted to provide the audio data sharing mobile application with access to a digital certificate having one or more keys that authenticates audio communication over the speaker and the microphone. These keys can include public keys associated with employees and/or partners of an enterprise (as discussed above with reference to the discussion of the FIGS. 1A-1B.

Continuing with the previous embodiment and in another case, the distribute module 402 is also configured to dynamically update one or more of the keys in the digital certificate during operation of the audio data sharing application as it executes on the mobile device. So, as employees/partners are added or removed for the enterprise, the distributed audio data sharing application need not change, just the keys embedded in the digital certificate that the audio data sharing application is configured to dynamically access and inspect during its operation.

One now fully appreciates how multiple mobile devices can introduce and communicate with one another using audio communications over their speakers and microphones for purposes of audio proximity-based data sharing.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
communicating, by a mobile device, an audio message over a speaker interfaced to the mobile device and including in the audio message: a description of the mobile device, a name of a user operating the mobile device, and an identifier of a document that is to be provided from the mobile device;
receiving, by the mobile device, a second audio message in response to the audio message through a microphone interfaced to the mobile device, the second audio message received from a second speaker interfaced to a second mobile device;
facilitating, by the mobile device, delivery of the document associated with the mobile device to the second mobile device through audio communications between the mobile device and the second mobile device and providing through the audio communications the document as the document is being sent to and received from both the mobile device and the second mobile device and providing through the audio communications authentication between the mobile device and the second mobile device based on a proximity between the mobile device and the second mobile device; and
repeating, by the mobile device, the receiving and the facilitating for at least one third mobile device establishing a grouping of devices including the mobile device, the second mobile device, and the at least one third mobile device processing the audio communications by receiving and sending the document through the audio communications within the grouping.

2. The method of claim 1, wherein communicating further includes determining to initiate the communication over the speaker based on a selection made to share the document within an existing application's Application Programming Interface executing on the mobile device.

3. The method of claim 1, wherein communicating further includes determining to initiate the communication over the speaker based on an initial audio message received from the second mobile device through the microphone, the initial audio message identifying the document.

4. The method of claim 1, wherein communicating further includes providing a public key associated with the mobile device and acquisition details associated with the second mobile device acquiring the document, the public key and acquisition details embedded in the audio message.

5. The method of claim 1, wherein receiving further includes selecting the second audio message from a list that identifies the second mobile device and at least one other available selection for at least one other mobile device that is communicating via audio transmission to the mobile device.

6. The method of claim 1, wherein receiving further includes demodulating the second audio message to identify connection details for delivering the document to the second mobile device.

7. The method of claim 6, wherein demodulating further includes encrypting the document using a secret communicated from the second mobile device that was embedded in the demodulated second audio message.

8. The method of claim 1, wherein facilitating further includes asking the second mobile device via a third audio message communicated over the speaker for permission to deliver the document to the second mobile device before delivering the document to the second mobile device over a WiFi peer-to-peer connection between the mobile device and the second mobile device.

9. The method of claim 1, wherein facilitating further includes sending the document to the second mobile device in an encrypted format that is represented in a third audio message communicated over the speaker.

10. The method of claim 1, wherein facilitating further includes sending the document to the second mobile device by one of:
a Bluetooth connection, a WiFi connection, and as an encrypted acquisition details communicated in a third audio message over the speaker that instructs the second mobile device on where and how to acquire the document.

11. A method, comprising:
receiving, by a mobile device, an audio message over a microphone interfaced to the mobile device, wherein receiving further includes identifying within the audio message: a description of the a second mobile device that provides the audio message, a name of a user operating the second mobile device, and an identifier of a document that is to be provided from the second mobile device;
acquiring, by the mobile device; the document associated with the second mobile device based at least in part on the audio message and providing through audio communications the document as the document is being sent to and received from both the mobile device and the second mobile device and providing through the audio communications authentication between the mobile device and the second mobile device based on a proximity between the mobile device and the second mobile device; and
repeating, by the mobile device, the receiving and the acquiring for at least one third mobile device establishing a grouping of devices including the mobile device, the second mobile device, and the at least one third mobile device processing the audio communications by receiving and sending the document through the audio communications within the grouping.

12. The method of claim 11, wherein receiving further includes receiving the audio message in response to an initial audio message requesting the document made over a speaker interfaced to the mobile device.

13. The method of claim 12, wherein receiving further includes providing a secret embedded in the initial audio message, the second mobile device encrypting the document with the secret.

14. The method of claim 13, wherein providing further includes encrypting the secret embedded within the initial audio message with a public key for the second mobile device.

15. The method of claim 11, wherein acquiring further includes granting permission to the second mobile device to establish a network connection to the mobile device for delivering the document.

16. The method of claim 11, wherein acquiring further includes demodulating the audio message to obtain network acquisition details for obtaining the document.

17. The method of claim 11 further comprising, sending, by the mobile device, a second audio message over a speaker interfaced to the mobile device for receipt by a second microphone of the second mobile device, the second audio message when demodulated by the second mobile device confirming that the data was successfully acquired by the mobile device.

* * * * *

UNITED STATES PATENT AND TRADEMARK OFFICE
CERTIFICATE OF CORRECTION

PATENT NO. : 9,942,751 B2
APPLICATION NO. : 14/167862
DATED : April 10, 2018
INVENTOR(S) : Burch et al.

Page 1 of 1

It is certified that error appears in the above-identified patent and that said Letters Patent is hereby corrected as shown below:

In the Claims

In Column 11, Line 31, in Claim 11, delete "device;" and insert --device,-- therefor Signed and Sealed this
Eighteenth Day of June, 2019

Andrei Iancu
*Director of the United States Patent and Trademark Office*